US012632394B2

(12) United States Patent
Jindal et al.

(10) Patent No.: US 12,632,394 B2
(45) Date of Patent: May 19, 2026

(54) LOCAL STALING PARAMETER FOR CACHE MEMORY MANAGEMENT IN A PROCESSOR

(71) Applicant: QUALCOMM Incorporated, San Diego, CA (US)

(72) Inventors: Varun Jindal, Patiala (IN); George Patsilaras, San Diego, CA (US); Vivekanandan Naveen, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/428,277

(22) Filed: Jan. 31, 2024

(65) Prior Publication Data

US 2025/0245169 A1 Jul. 31, 2025

(51) Int. Cl.
*G06F 12/12* (2016.01)
*G06F 12/084* (2016.01)

(52) U.S. Cl.
CPC ............ *G06F 12/12* (2013.01); *G06F 12/084* (2013.01)

(58) Field of Classification Search
CPC .... G06F 12/12; G06F 12/084; G06F 12/0891; G06F 12/121; G06F 12/0806
USPC ........................................................ 711/133
See application file for complete search history.

(56) References Cited

U.S. PATENT DOCUMENTS

| 9,384,147 | B1* | 7/2016 | Morshed | ............... | G06F 12/123 |
| 2002/0010839 | A1* | 1/2002 | Tirumala | .............. | G06F 12/127 |
| | | | | | 711/E12.076 |
| 2014/0075118 | A1* | 3/2014 | Biswas | ................. | G06F 12/123 |
| | | | | | 711/E12.017 |
| 2021/0034527 | A1* | 2/2021 | Klingauf | ............. | G06F 12/0877 |

* cited by examiner

*Primary Examiner* — Jared I Rutz
*Assistant Examiner* — Wei Ma
(74) *Attorney, Agent, or Firm* — Loza & Loza LLP

(57) ABSTRACT

Aspects of the disclosure are directed to cache memory management. In accordance with one aspect, the disclosure includes a shared cache memory configured to store data into a plurality of cache lines; and a client coupled to the shared cache memory, the client configured to determine if a local staling state of one of the plurality of cache lines is inactive or active.

26 Claims, 7 Drawing Sheets

600

| Stale | LocalStale | |
|-------|-----------|---|
| 0 | 0 | Fresh VALID line |
| 0 | 1 | Fresh VALID line |
| 1 | 0 | Stale line, Anyone can replace |
| 1 | 1 | Stale line, Only OWNER can replace |

Figure 8:
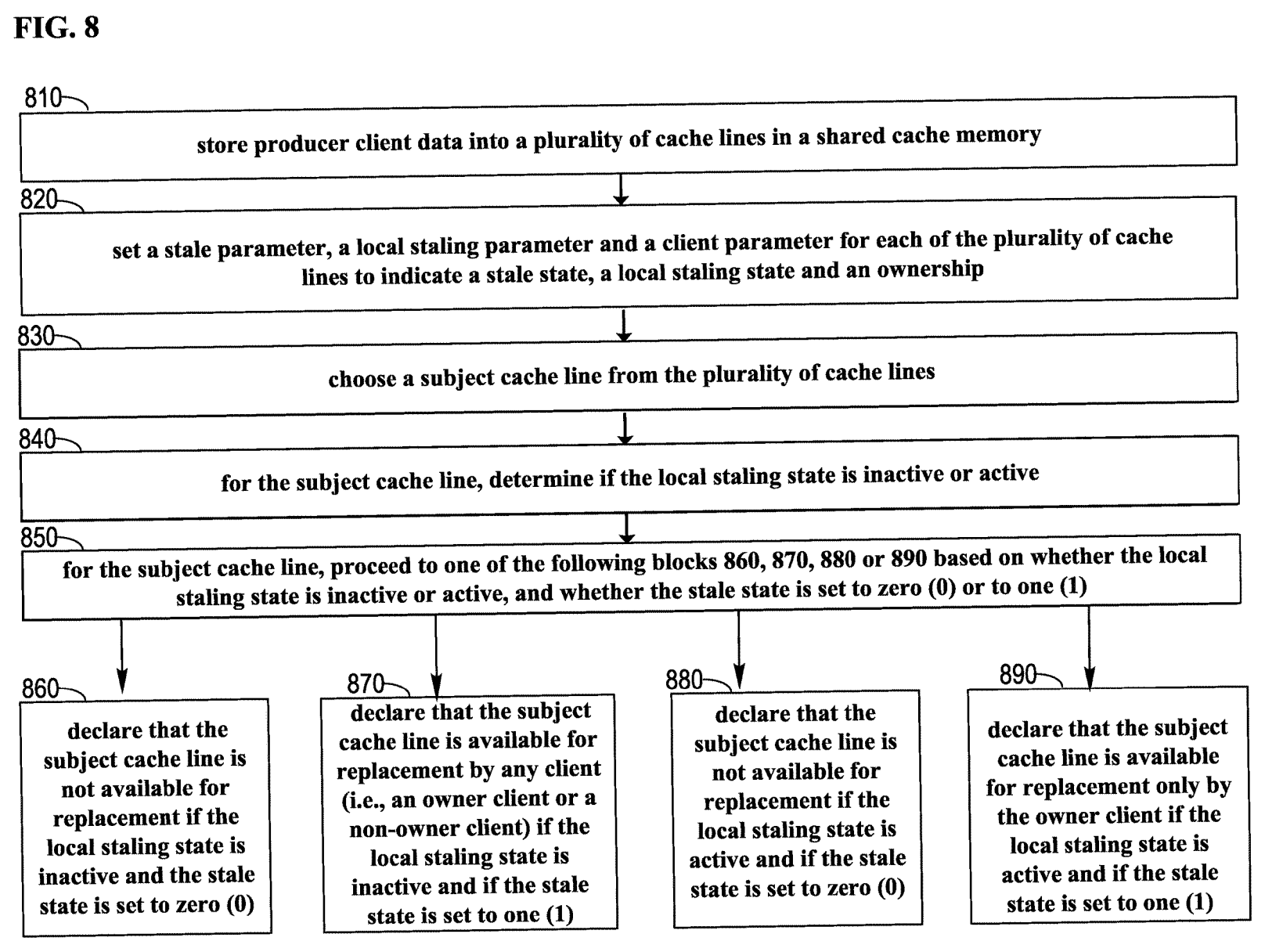

810 — store producer client data into a plurality of cache lines in a shared cache memory 820 — set a stale parameter, a local staling parameter and a client parameter for each of the plurality of cache lines to indicate a stale state, a local staling state and an ownership 830 — choose a subject cache line from the plurality of cache lines 840 — for the subject cache line, determine if the local staling state is inactive or active 850 — for the subject cache line, proceed to one of the following blocks 860, 870, 880 or 890 based on whether the local staling state is inactive or active, and whether the stale state is set to zero (0) or to one (1)

860 — declare that the subject cache line is not available for replacement if the local staling state is inactive and the stale state is set to zero (0)

870 — declare that the subject cache line is available for replacement by any client (i.e., an owner client or a non-owner client) if the local staling state is inactive and if the stale state is set to one (1)

880 — declare that the subject cache line is not available for replacement if the local staling state is active and if the stale state is set to zero (0)

890 — declare that the subject cache line is available for replacement only by the owner client if the local staling state is active and if the stale state is set to one (1)

LOCAL STALING PARAMETER FOR CACHE MEMORY MANAGEMENT IN A PROCESSOR

TECHNICAL FIELD

This disclosure relates generally to the field of information processing, and, in particular, to cache memory management in a processor using a local staling parameter.

BACKGROUND

In information processing, a hierarchy of memory devices are used by a processor for data and instruction storage. The hierarchy of memory devices may include a main memory and a cache memory. The cache memory is a memory device with faster read/write access but smaller capacity than main memory. In one example, the cache memory is accessed by the processor if a current instruction uses data which is currently stored in the cache memory. Cache memory access may significantly improve overall processor performance. However, since the cache memory is a shared resource among a plurality of processor clients, efficient cache memory management is desired for optimal processor performance.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides cache memory management. Accordingly, an apparatus including: a shared cache memory configured to store data into a plurality of cache lines; and a client coupled to the shared cache memory, the client configured to determine if a local staling state of one of the plurality of cache lines is inactive or active.

In one example, the client is further configured to determine if a stale state of the one of the plurality of cache lines is set to zero (0) or to one (1). In one example, the client is further configured to declare that the one of the plurality of cache lines is available for replacement only by an owner client. In one example, the local staling state is active, and the stale state is set to one (1). In one example, the client is a producer client. In one example, the client is an aggressor client.

In one example, the apparatus further includes a producer client coupled to the shared cache memory, the producer client configured to set a stale parameter, a local staling parameter and a client parameter for each cache line of the plurality of cache lines to indicate a stale state of the each cache line of the plurality of cache lines, a local staling state of the each cache line of the plurality of cache lines and an ownership of the each cache line of the plurality of cache lines.

Another aspect of the disclosure provides a method including: choosing a subject cache line from a plurality of cache lines in a shared cache memory; determining if a local staling state is inactive or active for the subject cache line;

determining if a stale state is set to zero (0) or one (1); and declaring that the subject cache line is available for replacement only by an owner client.

In one example, the method further includes requesting a replacement of the subject cache line by a client for a new data storage. In one example, the client is one of the following: a software application, a processor user, a processor peripheral device, a communications device, or a remote user. In one example, the local staling state is active, and the stale state is set to one (1).

In one example, the method further includes setting a local staling parameter for each cache line of the plurality of cache lines to indicate a local staling state for the each cache line of the plurality of cache lines. In one example, the method further includes setting a stale parameter for the each cache line of the plurality of cache lines to indicate a stale state for the each cache line of the plurality of cache lines. In one example, the local staling parameter is a binary value.

In one example, the method further includes setting a client parameter for the each cache line of the plurality of cache lines to indicate an ownership. In one example, the client parameter serves as an owner client identifier. In one example, the owner client identifier is a unique tag to represent a client of the shared cache memory. In one example, the client is one of the following: a software application, a processor user, a processor peripheral device, a communications device, or a remote user.

In one example, the method further includes storing a producer client data into the plurality of cache lines in the shared cache memory. In one example, the each cache line of the plurality of cache lines is a plurality of memory words. In one example, the method further includes organizing the producer client data into a plurality of buffers. In one example, the plurality of buffers is structured as a circular buffer.

Another aspect of the disclosure provides an apparatus for cache memory management, the apparatus including: means for choosing a subject cache line from a plurality of cache lines in a shared cache memory; means for determining if a local staling state is inactive or active for the subject cache line; means for determining if a stale state is set to zero (0) or one (1); and means for declaring that the subject cache line is available for replacement only by an owner client.

In one example, the apparatus further includes means for requesting a replacement of the subject cache line for a new data storage. In one example, the apparatus further includes means for setting a local staling parameter for each cache line of the plurality of cache lines to indicate a local staling state for the each cache line of the plurality of cache lines. In one example, the apparatus further includes means for setting a stale parameter for the each cache line of the plurality of cache lines to indicate a stale state for the each cache line of the plurality of cache lines. In one example, the apparatus further includes means for setting a client parameter for the each cache line of the plurality of cache lines to indicate an ownership. In one example, the apparatus further includes means for storing a producer client data into the plurality of cache lines in the shared cache memory.

Another aspect of the disclosure provides a non-transitory computer-readable medium storing computer executable code, operable on a device including at least one processor and at least one memory coupled to the at least one processor, wherein the at least one processor is configured to implement cache memory management, the computer executable code including: instructions for causing a computer to choose a subject cache line from a plurality of cache lines in a shared cache memory; instructions for causing the computer to determine if a local staling state is inactive or active for the subject cache line; instructions for causing the computer to determine if a stale state is set to zero (0) or one (1); and instructions for causing the computer to declare that the subject cache line is available for replacement only by an owner client.

In one example, the non-transitory computer-readable medium further includes: instructions for causing the computer to request a replacement of the subject cache line for a new data storage; instructions for causing the computer to set a local staling parameter for each cache line of the plurality of cache lines to indicate a local staling state for the each cache line of the plurality of cache lines; and instructions for causing the computer to set a stale parameter for the each cache line of the plurality of cache lines to indicate a stale state for the each cache line of the plurality of cache lines.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 8 illustrates an example flow diagram for a differentiated staling policy for a shared cache memory.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
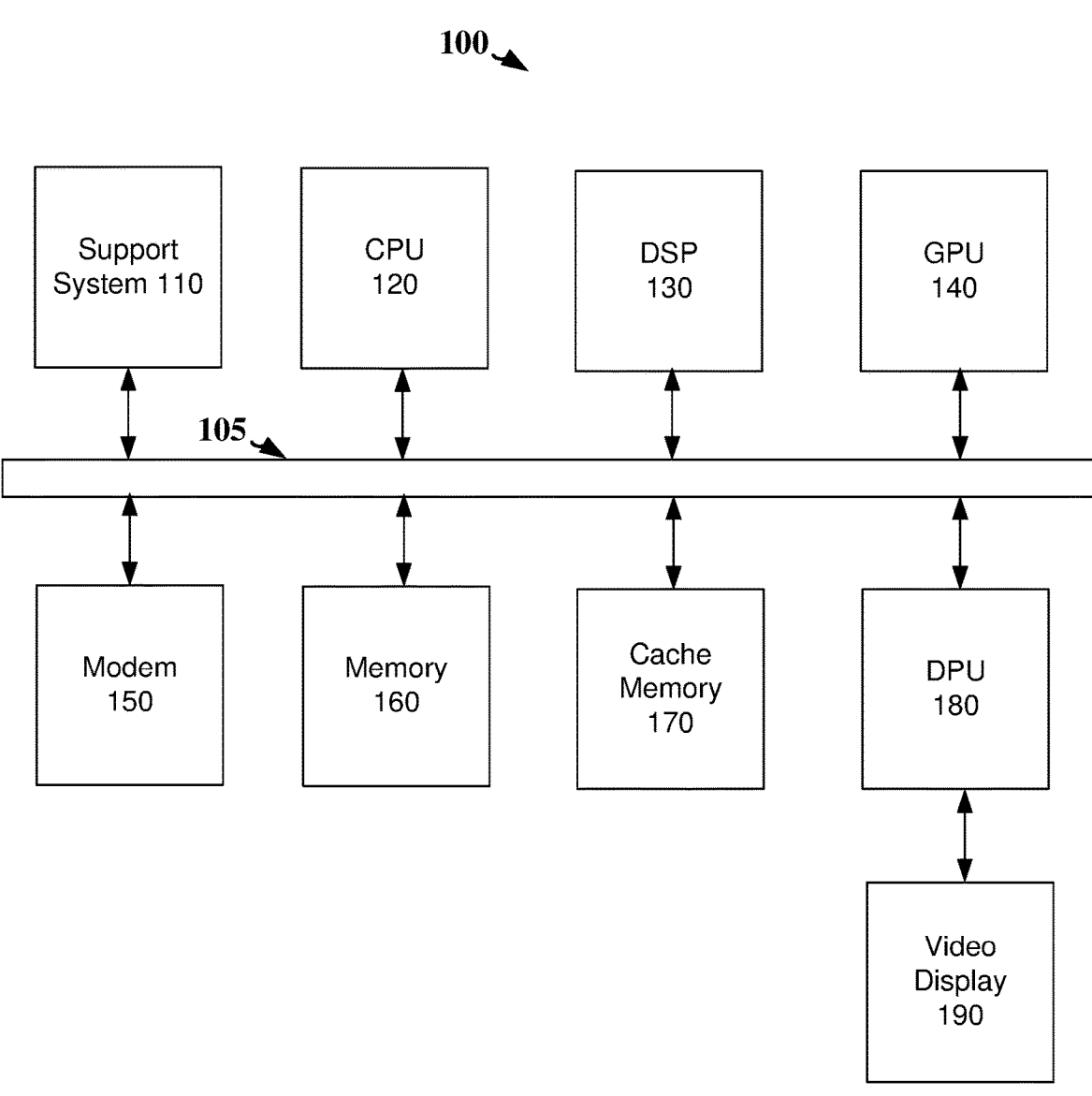
FIG. 1 illustrates an example information processing system.

FIG. 1 illustrates an example information processing system 100. In one example, the example information processing system 100 includes a plurality of processors or processing engines such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information. For example, the memory 160 and/or the cache memory 170 may be shared among the CPU 120, the GPU 140 and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory which is not shared with the other processing engines.

An information processing system, for example, a computing system with multiple slices (e.g., processing engines) or a system on a chip (SoC), may employ the cache memory 170 for rapid read or write memory access. In one example, the cache memory 170 is a shared resource for a plurality of processor clients. For example, processor clients are software applications, processor users, processor peripheral devices, communication devices, remote users, etc. In one example, the cache memory 170 requires cache memory management for efficient utilization of the shared resource.

In one example, the cache memory 170 is organized as a plurality of cache lines where each cache line is a plurality of memory words. In one example, a memory word is a smallest addressable increment of a memory. That is, a memory address is used as an identifier of a memory word which has a fixed size of M bits (e.g., M is an integer). For example, an active memory word is a memory word which stores active data.

In one example, the cache memory 170 is managed by cache memory management. In one example, one task of cache memory management is a cache replacement policy. In one example, the cache replacement policy defines rules by which memory words or cache lines being stored in the cache memory 170 should be replaced or evicted when the cache memory 170 is fully occupied with memory words.

In one example, ownership of a cache line refers to a client which stored its data in that cache line. That is, for a given cache line, there is one and only one owner client which stored data there and all other clients are non-owner clients for the given cache line.

In one example, an aggressor client may need to store aggressor data in the cache memory 170. In one example, other clients (e.g., producer clients or consumer clients) may set cache lines allocated by themselves as stale. In one example, the aggressor client may be prohibited from replacing valid cache lines which are owned by other clients, but may be allowed to replace empty or unused cache lines or stale cache lines. In one example, the aggressor client may replace stale cache lines owned by other clients prematurely. For example, premature replacement of stale cache lines may increase main memory traffic which may result in a higher dc power consumption.

Figure 2:
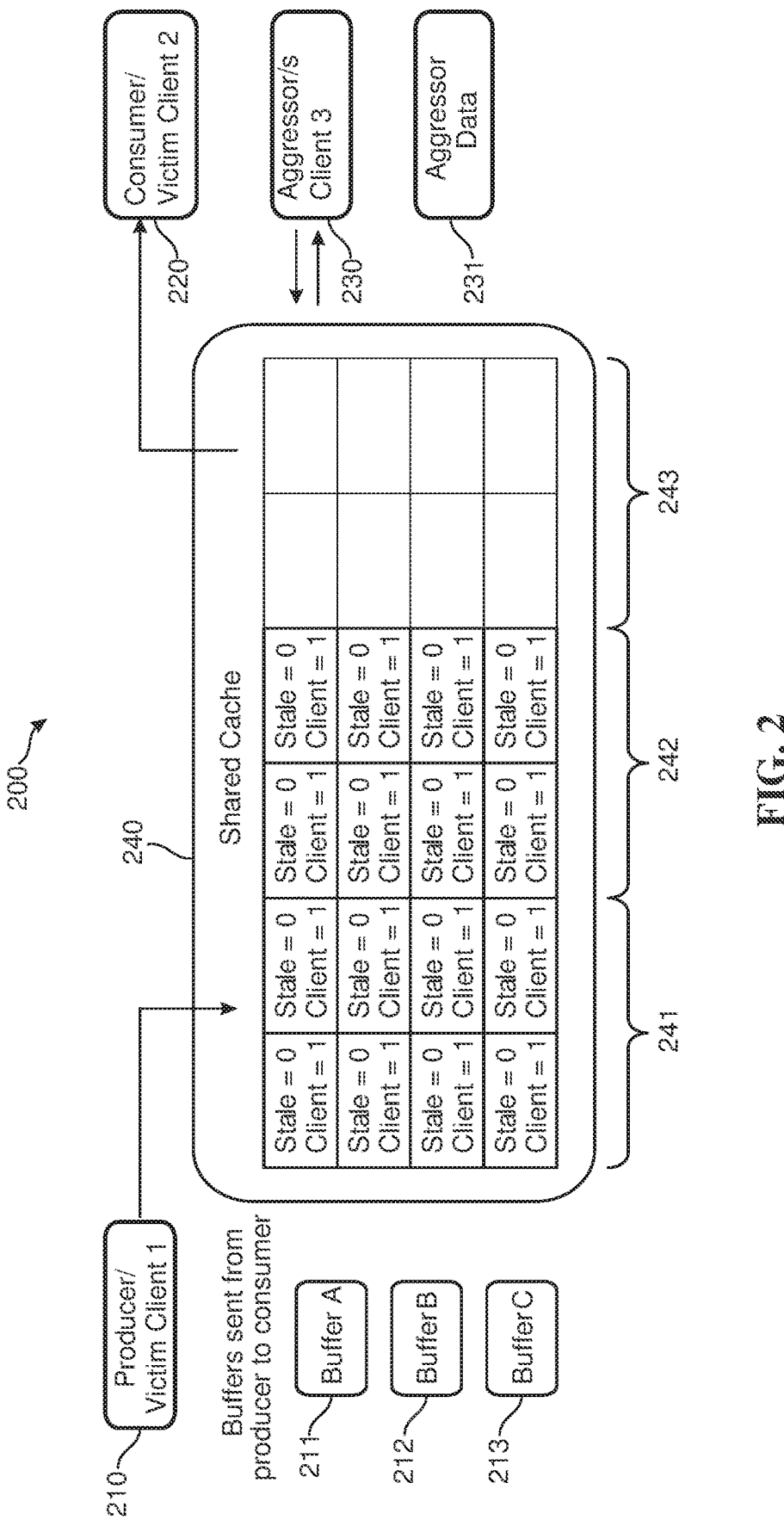
FIG. 2 illustrates a first phase of a first example implementation of a cache line replacement policy.

FIG. 2 illustrates a first phase 200 of a first example implementation of a cache line replacement policy. In one example, a first client 210 of a plurality of processor clients is a data producer (i.e., a client which produces data). In one example, the first client 210 generates a first data buffer 211 (Buffer A), a second data buffer 212 (Buffer B), and a third data buffer 213 (Buffer C) all destined for a second client 220 (i.e., a consumer) of the plurality of processor clients. In one example, the first client 210 uses a circular buffer queue to select a subsequent address pointer and writes data in a circular order: A>B>C>A>B>C . . . . In one example, the first client 210 sends data from the first data buffer 211, the second data buffer 212 and the third data buffer 213 to a shared cache memory 240.

In one example, in the first phase of the first example implementation of a cache line replacement policy, the first client 211 stores data from the first data buffer 211 into a first region 241 of the shared cache memory 240 with a stale parameter set to 0 to indicate valid data and a client parameter set to 1 to indicate ownership by the first client 210. In one example, data from the second data buffer 212 is stored into a second region 242 of the shared cache memory 240 with a stale parameter set to 0 and a client parameter set to 1. In one example, a third region 243 of the shared cache memory 240 is initially vacant.

In one example, in the first phase of the first example implementation of a cache line replacement policy, a third client 230 (i.e., an aggressor) may have aggressor data 231 which needs to be stored into the shared cache memory 240 but cannot execute storage since it has a lowest priority and can only replace stale cache lines (i.e., non-valid data) or unused cache lines only.

Figure 3:
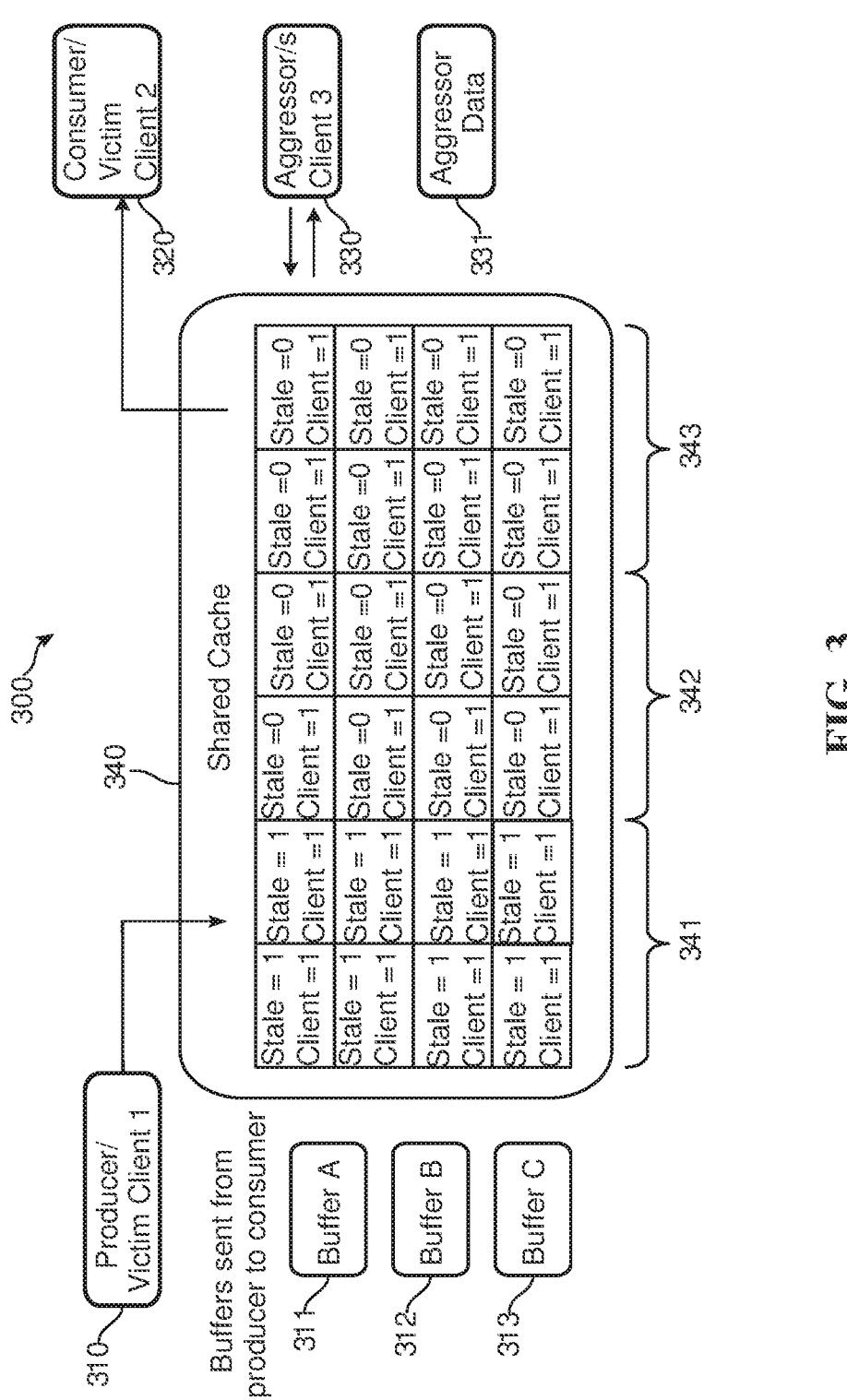
FIG. 3 illustrates a second phase of the first example implementation of a cache line replacement policy.

FIG. 3 illustrates a second phase 300 of the first example implementation of a cache line replacement policy. In one example, a first client 310 of a plurality of processor clients is a data producer (i.e., a client which produces data). In one example, the first client 310 generates a first data buffer 311 (Buffer A), a second data buffer 312 (Buffer B), and a third data buffer 313 (Buffer C) all destined for a second client 320 (i.e., a consumer) of the plurality of processor clients. In one example, the first client 310 uses a circular buffer queue to select a subsequent address pointer and writes data in a circular order: A>B>C>A>B>C . . . . In one example, the first client 310 sends the first data buffer 311, the second data buffer 312 and the third data buffer 313 to a shared cache memory 340.

In one example, in the second phase of the first example implementation of a cache line replacement policy, after sending the second data buffer 312 to a second region 342 of the shared cache memory 340, the first client 310 resets data from the first data buffer 311 in a first region 341 of the shared cache memory 340 with a stale parameter reset to 1 to indicate stale data and a client parameter maintained at 1 to indicate ownership by the first client 310. In one example, indication of stale data allows a subsequent data buffer to be accommodated in the shared cache memory 340, for example the third data buffer 313. In one example, if there is enough capacity in the shared cache memory 340, the third data buffer 313 can be accommodated in a third region 343 of the shared cache memory 340 such that the first region 341 is intact.

Figure 4:
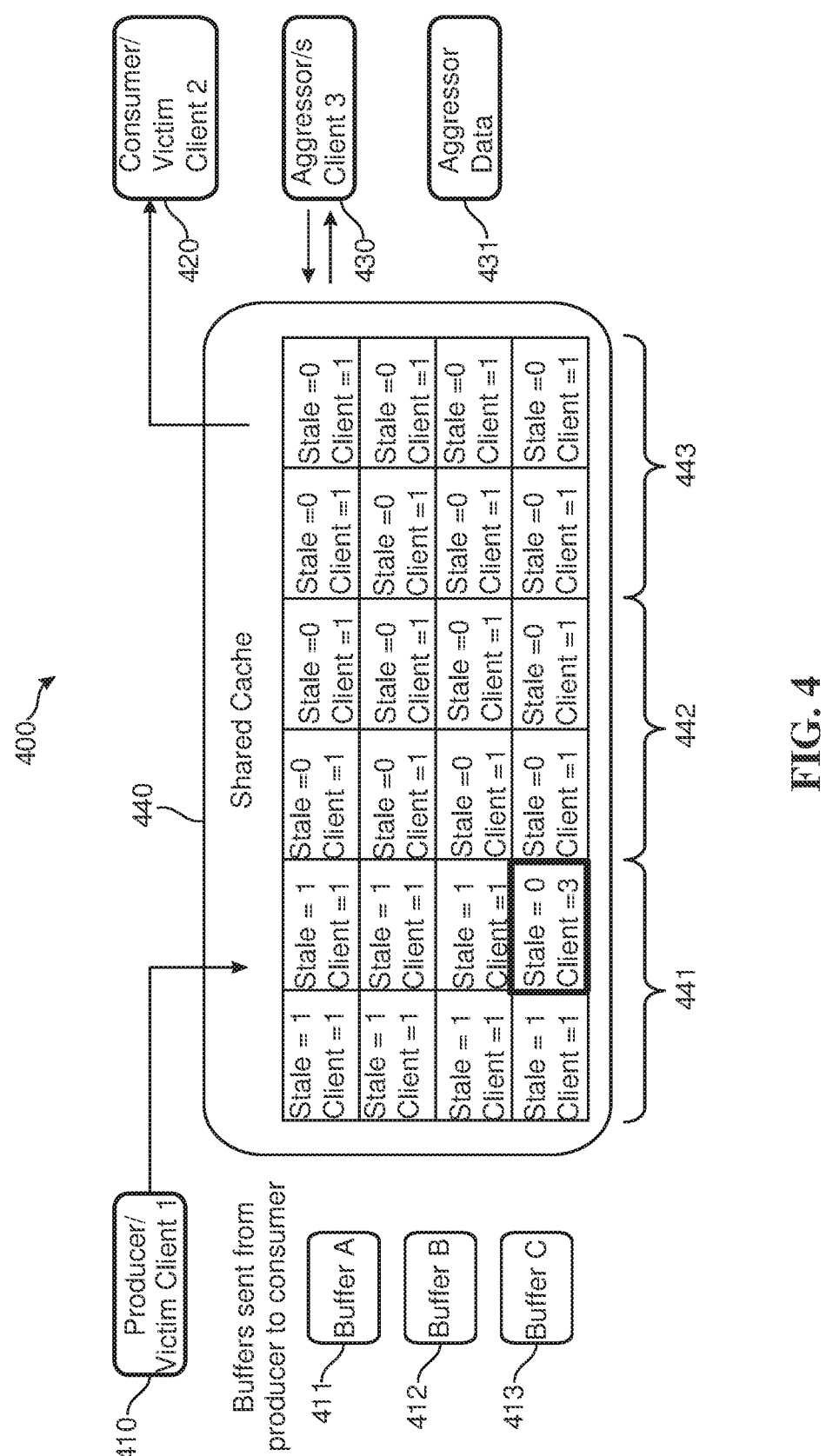
FIG. 4 illustrates a third phase of the first example implementation of a cache line replacement policy.

FIG. 4 illustrates a third phase 400 of the first example implementation of a cache line replacement policy. In one example, a third client 430 of a plurality of processor clients is able to access shared cache memory 440 by replacing stale cache lines for a first region 441, indicated by a stale parameter equal to 1, with aggressor data 431 and resetting its corresponding stale parameter to 0 and its client parameter to 3 to indicate ownership by the third client 430. In one example, the replacement of stale cache lines for the first region 441 represents replacement or eviction of data from a first data buffer 411 from the shared cache memory 440. In one example, the replacement may result in subsequent cache misses for the first data buffer 411 and increased memory access to a main memory (not shown) instead of the shared cache memory 440.

Figure 5:
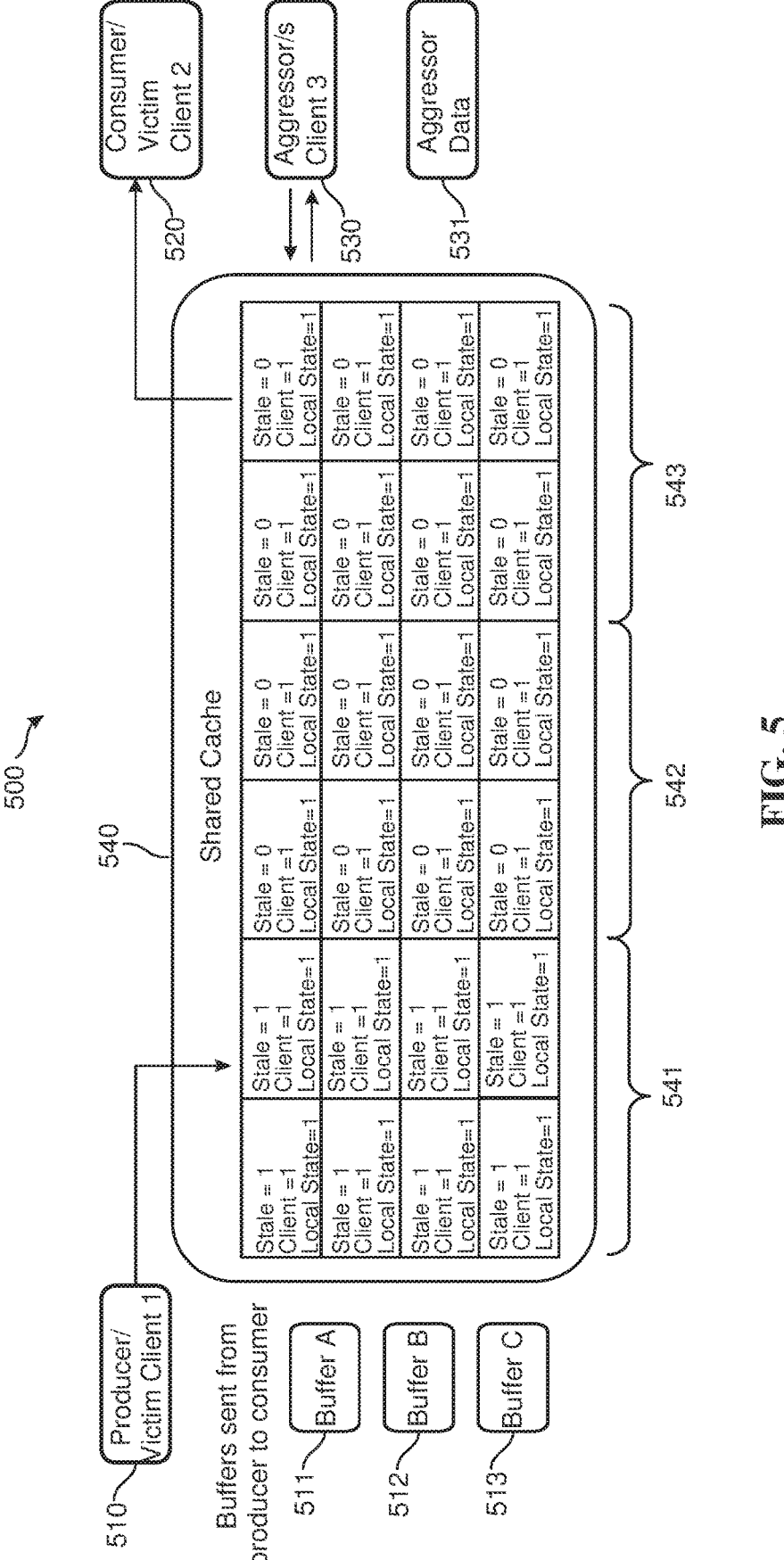
FIG. 5 illustrates a second example implementation of a cache line replacement policy.

FIG. 5 illustrates a second example implementation 500 of a cache line replacement policy. In one example, a first client 510 of a plurality of processor clients is a data producer (i.e., a client which produces data). In one example, the first client 510 generates a first data buffer 511 (Buffer A), a second data buffer 512 (Buffer B), and a third data buffer 513 (Buffer C) all destined for a second client 520 (i.e., a consumer) of the plurality of processor clients. In one example, the first client 510 uses a circular buffer queue to select a subsequent address pointer and writes data in a circular order: A>B>C>A>B>C . . . . In one example, the first client 510 sends the first data buffer 511, the second data buffer 512 and the third data buffer 513 to a shared cache memory 540.

In one example, in the second example implementation of the cache line replacement policy, the first client 510 stores data from the first data buffer 511 into a first region 541 of the shared cache memory 540 with a stale parameter initially set to 0 to indicate valid data and a client parameter set to 1 to indicate ownership by the first client 510. In one example, data from the second data buffer 512 is stored into a second region 542 of the shared cache memory 540 with a stale parameter initially set to 0 and a client parameter set to 1.

In one example, data from the third data buffer 513 is stored into a third region 543 of the shared cache memory 540 with a stale parameter initially set to 0 and a client parameter set to 1. In one example, as 513 operation completes shared cache memory 541 will update its stale parameter to 1 from 0.

In one example, in the second example implementation of the cache line replacement policy, data from the first data buffer 511, the second data buffer 512 and the third data buffer 513 also include a local staling parameter to provide a differentiated staling policy for the shared cache memory 540.

In one example, the differentiated staling policy uses the local staling parameter of a particular cache line to prioritize cache line replacement or eviction by an owner of the particular cache line. In one example, if the local staling parameter of the particular cache line is set to 1, then data associated with the particular cache line appears as valid (i.e., non-stale) data to clients that are not owners of the particular cache line. That is, clients which are not owners of the particular cache line cannot replace the data.

In one example, if the local staling parameter of the particular cache line is set to 1, and the stale parameter is also set to 1, then data associated with the particular cache line appears as stale data to the owner of the particular cache line. That is, an owner client of the particular cache line can replace the data. In one example, with the staling parameter and local staling parameter are set to 1, incoming writes from the owner client of the particular cache line may prefer that cache line for replacement or eviction, rather than use a generic cache line replacement policy. In one example, usage of the local staling parameter minimizes additional main memory writebacks due to replacement or eviction by aggressor clients and allows only main memory writebacks by the owner client. In one example, overall last level cache controller (LLCC) allocation by the owner client may increase as a result of the usage of the local staling parameter.

In one example, in the second example implementation of the cache line replacement policy, a third client 530 (i.e., an aggressor) may have aggressor data 531 which needs to be stored into the shared cache memory 540 but cannot execute storage since it can only replace cache lines with stale parameter set to 1, and local staling parameter=1 if its client parameter matches the client parameter of the owner client.

Figure 6:
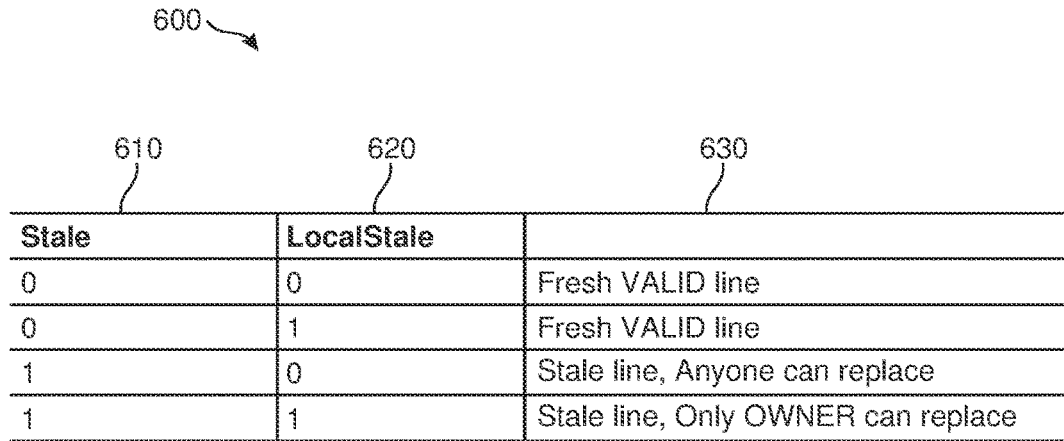
FIG. 6 illustrates an example state table for a differentiated staling policy for a shared cache memory.

FIG. 6 illustrates an example state table 600 for a differentiated staling policy for a shared cache memory. In one example, a first column 610 enumerates a stale parameter. For example, the stale parameter is a binary value with a value of 0 indicating a valid data state and a value of 1 indicating a stale data state. In one example, a second column 620 enumerates a local staling parameter. For example, the local staling parameter is a binary value with a value 0 indicating a local staling state is inactive and a value of 1 indicating a local staling state is active. In one example, a third column 630 lists a description for four staling states, where each staling state is defined by a concatenation of the stale parameter and the local staling parameter. In one example, a first staling state, labeled as 00, indicates a valid data state since the stale parameter is 0. In one example, a second staling state, labeled as 01, indicates a valid data state since the stale parameter is 0. In one example, a third staling state, labeled as 10, indicates a stale data state where any client (i.e., owner client and non-owner clients) can replace data since the local staling parameter is 0. In one example, a fourth staling state, labeled as 11, indicates a stale data state where only an owner client can replace data since the local staling parameter is 1. That is, when both the stale parameter and the local staling parameter are set to 1, only the owner client may replace or evict data from a cache line in which it wrote the data.

Figure 7:
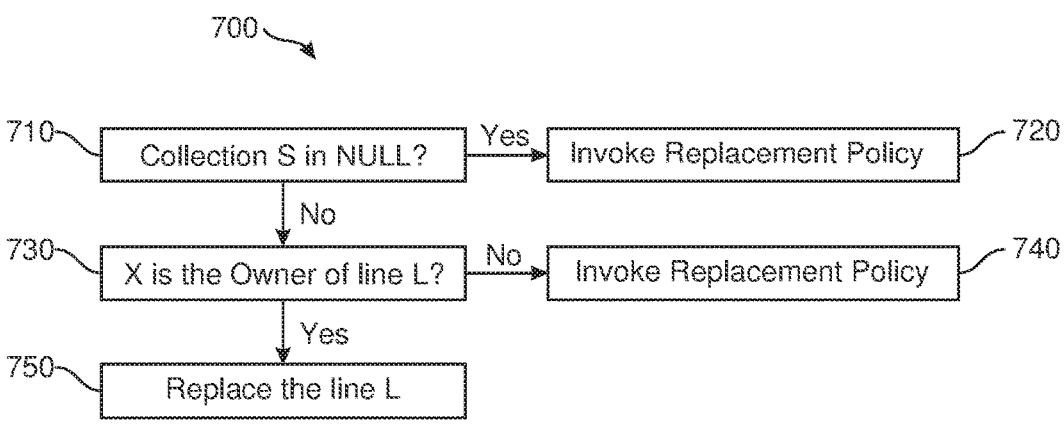
FIG. 7 illustrates an example graphical overview of a differentiated staling policy for a shared cache memory.

FIG. 7 illustrates an example graphical overview 700 of a differentiated staling policy for a shared cache memory. In one example, if a client X needs to replace or evict data from a cache line L, a cache controller determines a stale parameter is set to 1 and a local staling parameter is set to 1. In one example, resultant cache lines are logically grouped into a set of cache lines S. In task 710, perform a first logical test of whether a set of cache lines S is null (i.e., empty of data). If yes, proceed to task 720 and invoke a data replacement policy for the set of cache lines S. If no, proceed to task 730 and perform a second logical test of whether a client X is an owner client of cache line L. If no, proceed to task 740 and find another cache line (i.e., not cache line L) for replacement. If yes, proceed to task 750 and replace cache line L with new data.

FIG. 8 illustrates an example flow diagram 800 for a differentiated staling policy for a shared cache memory. In block 810, store a producer client data into a plurality of cache lines in a shared cache memory. That is, a producer client data is stored into a plurality of cache lines in a shared cache memory. In one example, each cache line of the plurality of cache lines is a plurality of memory words. In one example, the producer client data is organized into a plurality of buffers. In one example, the plurality of buffers is structured as a circular buffer.

In block 820, set a stale parameter, a local staling parameter and a client parameter for each cache line of the plurality of cache lines to indicate a stale state, a local staling state and an ownership. That is, a stale parameter for each cache line of the plurality of cache lines is set to indicate a stale state. That is, a local staling parameter for each cache line of the plurality of cache lines is set to indicate a local staling state. That is, a client parameter for each cache line of the plurality of cache lines is set to indicate an ownership.

In one example, the local staling parameter is a binary value. In one example, if the local staling parameter for a particular cache line is zero, the local staling state is inactive and any client (i.e., owner client and non-owner clients) can replace data in that particular cache line. In one example, if the local staling parameter for a particular cache line is one, the local staling state is active and only an owner client can replace data in that particular cache line based on the replacement policy hints. In one example, the client parameter serves as an owner client identifier. In one example, the owner client identifier is a unique tag to represent a specific client of the shared cache memory. In one example, the specific client may be a software application, a processor user, a processor peripheral device, a communications device, or a remote user.

In block 830, choose a subject cache line from the plurality of cache lines. That is, a subject cache line is chosen from the plurality of cache lines. In one example, the subject cache line is requested by a client for new data storage.

In block 840, for the subject cache line, determine if the local staling state is inactive or active. That is, for the subject cache line, the local staling state is determined if it is inactive or active. In one example, if the local staling state is inactive, then the subject cache line is subject to replacement by any client based on the replacement policy hints. In one example, if the local staling state is active, then the subject cache line is subject to replacement only by the owner client.

In block 850, for the subject cache line, determine if the stale state is set to zero (0) or one (1) and proceed to one of the following blocks 860, 870, 880 or 890 based on whether the local staling state is inactive or active, and whether the stale state is set to zero (0) or to one (1). That is, for the subject cache line, proceed to one of the following blocks 860, 870, 880 or 890 based on whether the local staling state is inactive or active, and whether the stale state is set to zero (0) or to one (1).

In block 860, declare that the subject cache line is not available for replacement if the local staling state is inactive and the stale state is set to zero (0). That is, the subject cache line is declared not available for replacement if the local staling state is inactive and the stale state is set to zero (0).

In block 870, declare that the subject cache line is available for replacement by any client (i.e., an owner client or a non-owner client) if the local staling state is inactive and if the stale state is set to one (1). That is, the subject cache line is declared available for replacement by any client (i.e., an owner client or a non-owner client) if the local staling state is inactive and if the stale state is set to one (1).

In block 880, declare that the subject cache line is not available for replacement if the local staling state is active and if the stale state is set to zero (0). That is, the subject cache line is declared not available for replacement if the local staling state is active and if the stale state is set to zero (0).

In block 890, declare that the subject cache line is available for replacement only by the owner client if the local staling state is active and if the stale state is set to one (1). That is, the subject cache line is declared available for replacement only by the owner client if the local staling state is active and if the stale state is set to one (1). In one example, a non-owner client is not able to replace the subject cache line if its client parameter does not match a client parameter of the subject cache line.

In one aspect, one or more of the steps for providing cache memory management in FIG. 8 may be executed by one or more processors which may include hardware, software, firmware, etc. The one or more processors, for example, may be used to execute software or firmware needed to perform the steps in the flow diagram of FIG. 8. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustra-tion." Any implementation or aspect described herein as "exemplary" is not necessarily to be construed as preferred or advantageous over other aspects of the disclosure. Like-wise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conduc-tors that, when connected and configured, enable the per-formance of the functions described in the present disclo-sure, without limitation as to the type of electronic circuits, as well as software implementations of information and instructions that, when executed by a processor, enable the performance of the functions described in the present dis-closure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be effi-ciently implemented in software and/or embedded in hard-ware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the lan-guage of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
a shared cache memory comprising a plurality of cache lines, wherein each of the plurality of cache lines includes a plurality of memory words, a stale parameter bit, a client parameter bit and a local staling parameter bit, wherein each of the plurality of memory words stores active data, the stale parameter bit indicates validity of the active data, the client parameter bit indicates ownership and the local staling parameter bit indicates replacement or eviction policy of the each of the plurality of cache lines to provide a differentiated staling policy for the shared cache memory; and
a client coupled to the shared cache memory, the client configured to allow a cache line replacement or a cache line eviction only by an owner client of one of the plurality of cache lines if the local staling parameter bit for the one of the plurality of cache lines is set to one (1) and if the stale parameter bit for the one of the plurality of cache lines is set to one (1).

2. The apparatus of claim 1, wherein the local staling parameter bit is active and the stale parameter bit is set to one (1) for a remaining of the plurality of cache lines.

3. The apparatus of claim 2, wherein the client is a producer client.

4. The apparatus of claim 2, wherein the client is an aggressor client.

5. The apparatus of claim 1 further comprising a producer client coupled to the shared cache memory, the producer client configured to set the stale parameter bit, the local staling parameter bit and the client parameter bit for the remaining each cache line of the plurality of cache lines to indicate a stale state of the remaining each cache line of the plurality of cache lines, a local staling state of the remaining each cache line of the plurality of cache lines and the ownership of the remaining each cache line of the plurality of cache lines.

6. A method comprising:
choosing a subject cache line from a plurality of cache lines in a shared cache memory wherein each of the plurality of cache lines includes a plurality of memory words, a stale parameter bit, a client parameter bit and a local staling parameter bit, wherein each of the plurality of memory words stores active data, the stale parameter bit indicates validity of the active data, the client parameter bit indicates ownership and the local staling parameter bit indicates replacement or eviction policy of the each of the plurality of cache lines;
determining that the stale parameter bit is set to 1 and that the local staling parameter bit is set to 1 for the subject cache line; and
declaring that the subject cache line is available for replacement or eviction only by an owner client and only when the stale parameter and the local staling parameter bit are set to 11.

7. The method of claim 6, further comprising requesting a replacement of the subject cache line by a client for a new data storage.

8. The method of claim 7, wherein the client is one of the following: a software application, a processor user, a processor peripheral device, a communications device, or a remote user.

9. The method of claim 8, further comprising setting the local staling parameter bit for a remaining each cache line of the plurality of cache lines to indicate a local staling state for the remaining each cache line of the plurality of cache lines.

10. The method of claim 9, further comprising setting the stale parameter bit for the remaining each cache line of the plurality of cache lines to indicate a stale state for the remaining each cache line of the plurality of cache lines.

11. The method of claim 10, further comprising setting the client parameter bit for the remaining each cache line of the plurality of cache lines to indicate the ownership.

12. The method of claim 11, wherein the client parameter serves as an owner client identifier.

13. The method of claim 12, wherein the owner client identifier is a unique tag to represent a client of the shared cache memory.

14. The method of claim 13, wherein the client is one of the following: a software application, a processor user, a processor peripheral device, a communications device, or a remote user.

15. The method of claim 11, further comprising storing a producer client data into the remaining plurality of cache lines in the shared cache memory.

16. The method of claim 15, wherein the each cache line of the plurality of cache lines is a plurality of memory words.

17. The method of claim 16, further comprising organizing the producer client data into a plurality of buffers.

18. The method of claim 17, wherein the plurality of buffers is structured as a circular buffer.

19. An apparatus for cache memory management, the apparatus comprising:
means for choosing a subject cache line from a plurality of cache lines in a shared cache memory wherein each of the plurality of cache lines includes a plurality of memory words, a stale parameter bit, a client parameter bit and a local staling parameter bit, wherein each of the plurality of memory words stores active data, the stale parameter bit indicates validity of the active data, the client parameter bit indicates ownership and the local staling parameter bit indicates replacement or eviction policy of the each of the plurality of cache lines;
means for determining that the stale parameter bit is set to 1 and that the local staling parameter bit is set to 1 for the subject cache line; and
means for declaring that the subject cache line is available for replacement or eviction only by an owner client and only when the stale parameter and the local staling parameter bit are set to 11.

20. The apparatus of claim 19, further comprising means for requesting a replacement of the subject cache line for a new data storage.

21. The apparatus of claim 20, further comprising means for setting the local staling parameter bit for a remaining each cache line of the plurality of cache lines to indicate a local staling state for the remaining each cache line of the plurality of cache lines.

22. The apparatus of claim 21, further comprising means for setting the stale parameter bit for the remaining each cache line of the plurality of cache lines to indicate a stale state for the remaining each cache line of the plurality of cache lines.

23. The apparatus of claim 22, further comprising means for setting the client parameter bit for the remaining each cache line of the plurality of cache lines to indicate the ownership.

24. The apparatus of claim 23, further comprising means for storing a producer client data into one or more of the plurality of cache lines in the shared cache memory.

25. A non-transitory computer-readable medium storing computer executable code, operable on a device comprising at least one processor and at least one memory coupled to the at least one processor, wherein the at least one processor is configured to implement cache memory management, the computer executable code comprising:

instructions for causing a computer to choose a subject cache line from a plurality of cache lines in a shared cache memory wherein each of the plurality of cache lines includes a plurality of memory words, a stale parameter bit, a client parameter bit and a local staling parameter bit, wherein each of the plurality of memory words stores active data, the stale parameter bit indicates validity of the active data, the client parameter bit indicates ownership and the local staling parameter bit indicates replacement or eviction policy of the each of the plurality of cache lines;

instructions for causing the computer to determine that the stale parameter bit is set to 1 and that the local staling parameter bit is set to 1 for the subject cache line;

instructions for causing the computer to set the local staling parameter bit for a remaining each cache line of the plurality of cache lines to indicate a local staling state for the remaining each cache line of the plurality of cache lines; and instructions for causing the computer to declare that the subject cache line is available for replacement or eviction only by an owner client and only when the stale parameter and the local staling parameter bit are set to 11.

26. The non-transitory computer-readable medium of claim 25, further comprising:

instructions for causing the computer to request a replacement of the subject cache line for a new data storage; and instructions for causing the computer to set the stale parameter bit for the remaining each cache line of the plurality of cache lines to indicate a stale state for the remaining each cache line of the plurality of cache lines.

* * * * *